US010650587B2

(12) United States Patent
Lu et al.

(10) Patent No.: US 10,650,587 B2
(45) Date of Patent: May 12, 2020

(54) ISOSURFACE GENERATION METHOD AND VISUALIZATION SYSTEM

(71) Applicant: Canon USA Inc., Melville, NY (US)

(72) Inventors: Zhimin Lu, Chelmsford, MA (US); Hitoshi Nakamura, Boston, MA (US)

(73) Assignee: Canon U.S.A., Inc., Melville, NY (US)

( * ) Notice: Subject to any disclaimer, the term of this patent is extended or adjusted under 35 U.S.C. 154(b) by 0 days.

(21) Appl. No.: 16/125,232

(22) Filed: Sep. 7, 2018

(65) Prior Publication Data

US 2020/0082618 A1  Mar. 12, 2020

(51) Int. Cl.
*G06T 15/08* (2011.01)
*G06T 17/20* (2006.01)
*G06T 5/00* (2006.01)

(52) U.S. Cl.
CPC .............. *G06T 17/20* (2013.01); *G06T 5/002* (2013.01); *G06T 15/08* (2013.01); *G06T 2207/10088* (2013.01)

(58) Field of Classification Search
CPC ......... G06T 5/002; G06T 15/08; G06T 17/20; G06T 2207/10088
See application file for complete search history.

(56) References Cited

U.S. PATENT DOCUMENTS

| | | | |
|---|---|---|---|
| 4,710,876 A | 12/1987 | Cline et al. | |
| 4,984,157 A | 1/1991 | Cline et al. | |
| 7,538,764 B2 | 5/2009 | Salomie | |
| 9,025,858 B2 | 5/2015 | Seong | |
| 2005/0219245 A1* | 10/2005 | Tao | G06T 17/20 345/424 |
| 2006/0066613 A1* | 3/2006 | Elshishiny | G06T 17/20 345/423 |

OTHER PUBLICATIONS

Shekhar, Raj, et al. "Octree-based decimation of marching cubes surfaces." Proceedings of Seventh Annual IEEE Visualization'96. IEEE, 1996 (Year: 1996).*
Laramee, Robert S., and R. Daniel Bergeron. "An isosurface continuity algorithm for super adaptive resolution data." Advances in Modelling, Animation and Rendering. Springer, London, 2002. 215-237. (Year: 2002).*
He, T., et al, "Controlled Topology Simplification", IEEE Transactions on Visualization and Computer Graphics, 1996, pp. 171-184, vol. 2, No. 2.

(Continued)

*Primary Examiner* — Diane M Wills
(74) *Attorney, Agent, or Firm* — Canon U.S.A., Inc. I.P. Division (57) ABSTRACT

The present invention relates to a method and system for constructing isosurfaces from 3D data sets, such as 3D image data that are based on a cubic grid (voxel image data). Specifically, 3D image is rendered from a voxel image that can be generated by a variety of medical modalities. The present invention is a modification of the MCA that allows for constructing an isosurface without holes resulting from some cubes having ambiguous isosurface topology. Specifically, to avoid holes resulting from ambiguities, multiple isosurfaces having different resolution levels are generated for ambiguous cubes to resolve the ambiguity.

22 Claims, 5 Drawing Sheets

(56) References Cited

OTHER PUBLICATIONS

Chernyaev, "Marching Cubes 33: Construction of Topologically Correct Isosurfaces", European Organization for Nuclear Research, Graphicon '95, Jul. 1995.
Schlei, B.R., "Volume-Enclosing Surface Extraction", Jun. 2012, GSI Helmoltz Centre for Heavy Ion Research GmbH.
Ho, C., et al, "Cubical Marching Squares: Adaptive Feature Preserving Surface Extraction from Volume Data", Eurographics 2005, vol. 24, No. 3.
Montani, C., et al, "Discretized Marching Cubes" Italy.
Nelson, G. M., et al, "The Asymptomatic Decider: Resolving the Ambiguity in Marching Cubes", IEEE, 1991, pp. 83-91.

* cited by examiner

ISOSURFACE GENERATION METHOD AND VISUALIZATION SYSTEM

BACKGROUND

1. Field of the Invention

The present invention relates to a method and system for constructing isosurfaces from three-dimensional data sets, such as 3D image data that are based on regularly shaped, cubic lattices (voxel image data). Specifically, 3D image is rendered from a voxel image generated by computed tomography (CT), magnetic resonance imaging (MRI), or other medical modalities.

2. Discussion of the Background

The determination of implicit surfaces from 3D image data (voxel image data) has become an important tool within many fields of science and medicine. Isosurfaces can be used for visualization purposes, e.g., when 3D shapes that are contained in 3D image data should be rendered. A very popular algorithm for surface construction from 3D image data is marching cubes algorithm (MCA), which has been developed by Lorensen and Cline in the mid-1980s. In the description below MCA refers to the algorithm described by Lorensen and Cline in the above publications.

MCA is a computer graphics algorithm for extracting a polygonal mesh of an isosurface from a three-dimensional discrete scalar field associating a scalar value (voxel) to every point in a discrete space. A voxel represents a data point on a regularly spaced three-dimensional grid. This data point can consist of a single piece of data, such as opacity, or multiple pieces of data, such as a color in addition to opacity. A voxel represents only a single point on this grid, not a volume; the space between each voxel is not represented in a voxel-based dataset. A voxel value may represent various physical properties of imaged objects.

3D surfaces of the anatomy offer a valuable medical tool. Images of these surfaces, constructed from multiple 2D slices of CT, MR, and single-photon emission computed tomography (SPECT), help physicians to visualize the complex 3D anatomy present in the slices. MCA creates a polygonal representation of constant density surfaces from a 3D array of data (voxel image). The resulting model can be displayed with conventional graphics-rendering algorithms implemented in software or hardware.

Specifically, medical imaging hardware samples some physical property in a patient and produces multiple 2D slices of information. The sampled data depends on the data acquisition technique. X-ray CT measures the spatially varying X-ray attenuation coefficient. Magnetic resonance (MR) measures three physical properties. One property is the distribution of "mobile" hydrogen nuclei that shows overall structure within the slices. The other two measured properties are relaxation times of the nuclei. Single-photon emission computed tomography (SPECT) measures the emission of gamma rays. The source of these rays is a radioisotope distributed within the body.

An isosurface is a three-dimensional analog of an isoline. It is a surface that represents points of a constant value (e.g. pressure, temperature, velocity, density) within a volume of space; in other words, it is a level set of a continuous function whose domain is 3D-space. In medical imaging, isosurfaces may be used to represent regions of a particular density in a three-dimensional CT scan, allowing the visualization of internal organs, bones, or other structures.

The applications of MCA are mainly concerned with medical visualizations such as CT and MRI scan data images. An analogous two-dimensional method is called the marching squares algorithm. U.S. Pat. No. 4,710,876 to Cline et al. and a paper by Lorensen et al. ("Marching Cubes: A High Resolution 3D Surface Construction Algorithm," Computer Graphics, Volume 21, Number 4, July 1987) discloses MCA and is incorporated herein by reference in its entirety.

MCA proceeds through the scalar field, taking eight neighbor locations at a time (thus forming an imaginary cube), then determining the polygon(s) needed to represent the part of the isosurface that passes through this cube. The individual polygons are then fused into the desired surface.

Specifically, MCA for volume visualization produces triangle models of isosurfaces $F(x; y; z) = c$ of a scalar function given by samples over a cubic grid. MCA processes one cube at a time. It determines how the isosurface intersects the given cube, and then moves to the next cube. Since there are eight nodes (vertices) in each cube, and every node can be in two states, inside the isosurface (defined as 1) or outside the isosurface (defined as 0), there are $2^8 = 256$ different arrangements (00000000, 10000000, . . . , 11111111) of a cube relative to the isosurface.

An index to a pre-calculated array (lookup table) of 256 possible polygon configurations within the cube is created by treating each of the 8 scalar values (vertices) as a bit in an 8-bit integer. The final value, after all eight scalars are checked, is the actual index to the polygon indices lookup table. However, most of the arrangements are topologically equivalent, and by rotation and/or by switching the states (in/out) of the nodes, they can be related to one of the 15 configurations shown in the lookup table of FIG. 1. These configurations are incorporated into the lookup table. Each entry in the table contains a triangle pattern for a corresponding configuration. As demonstrated in FIG. 1, for configuration 0 (00000000 or 11111111) there are no triangles because all eight nodes lie inside or outside the isosurface. For configuration 1 (10000000 or 01111111) the pattern consists of one triangle, since the isosurface separates one node from the other seven. The patterns for other configurations have two, three or four triangles.

In summary, MCA "marches" through each of the cubes while testing the vertices and replacing the cube with an appropriate set of polygons. The sum total of all polygons generated will be a surface that approximates the one the data set describes. Each vertex and each edge of the cube is indexed for lookup in the lookup table of FIG. 1.

Finally, each vertex of the generated polygons is placed on the appropriate position along the cube's edge by linearly interpolating the two scalar values (voxels) that are connected by that edge. The gradient of the scalar field at each grid point is also the normal vector of a hypothetical isosurface passing from that point. Therefore, these normal vectors may be interpolated along the edges of each cube to find the normal vectors of the generated vertices which are essential for shading the resulting mesh with some illumination model.

Accordingly, MCA provides an efficient way to convert volumetric data into polygonal meshes. This method allows for accurately representing geometric objects as volumetric data, manipulate them volumetrically, and efficiently display them by converting the volumetric data into polygonal meshes.

Figure 1:
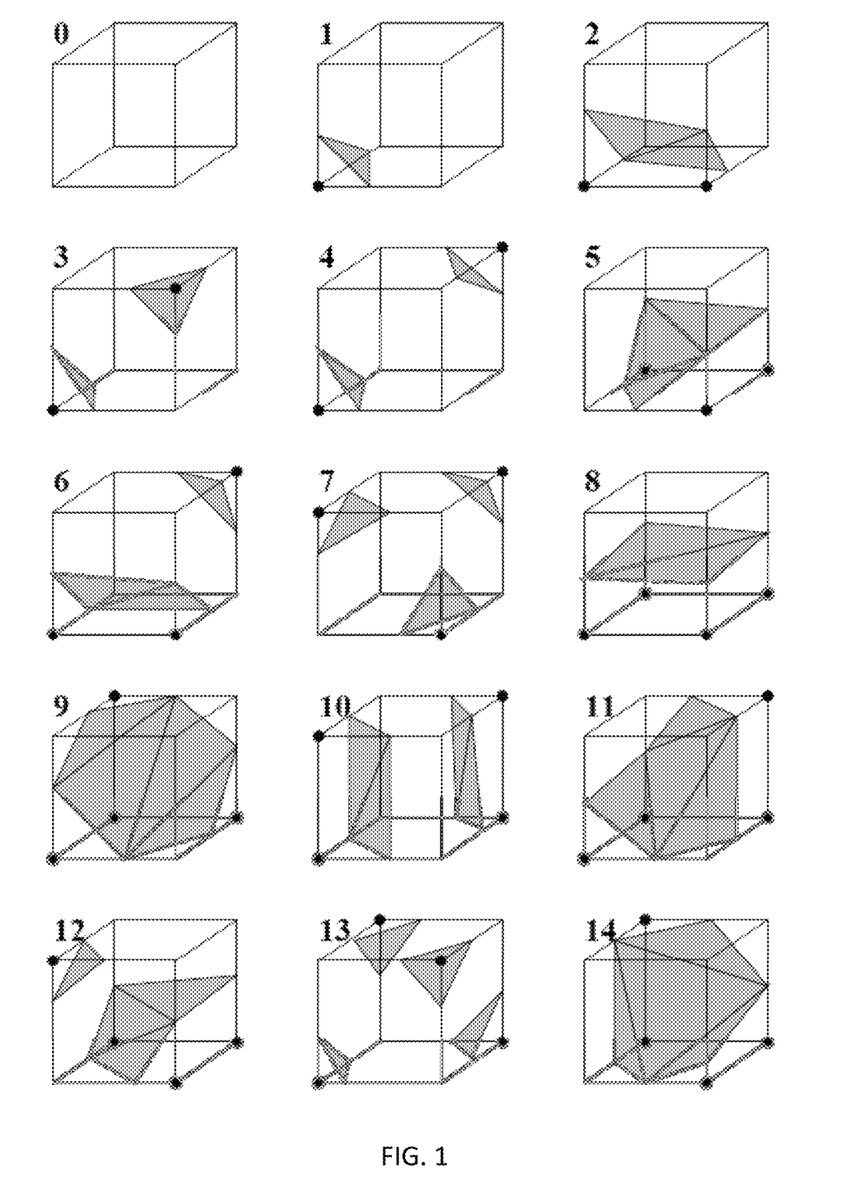
FIG. 1 demonstrates a lookup table of 15 possible polygon configurations within a cube according to MCA.

However, although original MCA is generally effective, it has problems with topological ambiguity of isosurfaces. Such ambiguities arise when there is more than one feasible surface assignment for a case in the lookup table of marching cubes (FIG. 1). Topological ambiguity of isosurfaces can lead to holes that appear as a result of the discrepancy in the connection of the vertices on the shared face of two adjacent cubes. There have been ambiguities found in certain configurations where there are more than one ways to triangulate. For instance, face ambiguity arises when a face has two diagonally opposite vertices marked positive and the other two marked negative. Each of the configurations 3, 6, 7, 10, 12 and 13 demonstrated in FIG. 1 has more than one isosurface candidates.

As noted above, the initial version of MCA exploited rotational and reflective symmetry and also sign changes to build the table with 15 unique cases as shown in the lookup table of FIG. 1. However, in meshing the faces, there are possibly ambiguous cases that can lead to meshing with holes. Topologically correct isosurfaces can still be constructed with extra effort. The problem is that for cases with "rippling" signs, there are at least two correct choices for where the correct contour should pass. The actual choice does not matter, but it has to be topologically consistent. An attempt to improve MCA was made by creating an extended table having 33 configurations instead of original 15 (Chernyaev, "Marching Cubes 33: Construction of Topologically Correct Isosurfaces").

In addition, the ambiguities of MCA were improved upon in later algorithms such as the asymptotic decider of Nielson and Hamann (Nielson et al., "The asymptotic decider: resolving the ambiguity in marching cubes"). This algorithm is based on an analysis of the variation of the scalar variable across ambiguous face. The analysis determines how the edges of isosurface polygon should be connected.

Figure 2A:
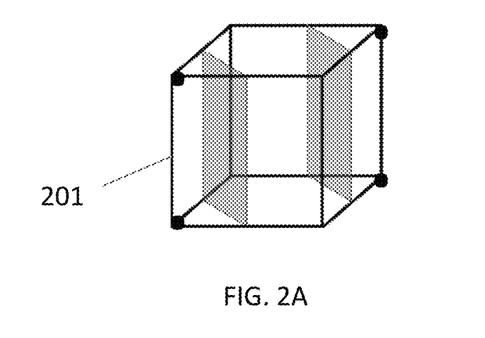
FIG. 2A and FIG. 2B demonstrate two different possible topologies (configurations) of an isosurface for a cube.
Figure 2B:
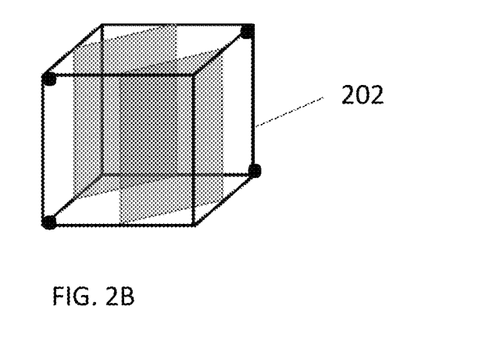

When a group of voxels is considered to form an isosurface, the candidate voxels may result in two or more possible surface construction, as depicted in FIG. 2A-B. These two isosurfaces are totally different. Each of the cases 3, 6, 7, 10, 12 and 13 demonstrated in FIG. 1 is ambiguous in that it has different isosurface candidates. Accordingly, a modification of the marching cube method is required to avoid ambiguity in selecting topology of the isosurface for a cube where multiple possibilities exist.

SUMMARY OF THE INVENTION

According to one aspect of the invention, a method and system for generating an isosurface from a voxel image obtained from a medical modality is provided. In one embodiment, the voxel image is obtained from a CT or MRI system. Specifically, MCA is applied to at least a portion of the voxel image using a first cubic grid to generate a first isosurface. The first cubic grid corresponds to a first spatial resolution. Next, MCA is applied to the same portion of the voxel image using a second cubic grid to generate a second isosurface. The second cubic grid corresponds to a second spatial resolution. The second spatial resolution is lower than the first. In one embodiment, the ratio of the first and second resolution is a power of two. In yet another embodiment, the ratio of the first and second resolution is not limited to the power of two. The first and second isosurfaces are displayed to the user. The next step of the method is directed to identifying ambiguous cubes on the first grid, i.e. cubes having an ambiguity in isosurface topology. If a cube of the first grid is ambiguous, then, a determination is made whether there is a difference between the first and second isosurfaces. If the first isosurface is different from the second isosurface, the first isosurface is modified based on the second isosurface. In one embodiment, the difference between the first and second isosurfaces is determined based on connections between faces of cubes defining the first and second isosurfaces.

In one embodiment, if the second cubic grid has ambiguous cubes, MCA is applied to the same portion of the voxel image using a third cubic grid. The third grid corresponds to a third spatial resolution that is lower than the second spatial resolution.

In one embodiment, when two faces of the first isosurface are connected and the corresponding two faces of the second isosurface are disconnected, the first isosurface is modified to disconnect. In yet another embodiment, when at least one of the first and second isosurfaces is disconnected, the first isosurface is modified to disconnect. When at least one of the first and second isosurfaces is connected, the first isosurface is modified to connect. When only the first isosurface includes disconnected parts due to noise, the parts are removed.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION OF THE INVENTION

The present invention has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

The present invention relates to a process for displaying three dimensional surface images. In particular, a voxel image based on data from MRI, CT systems, or other medical modalities is supplied to a set of intensity registers. The values in the intensity registers are compared with a predetermined threshold defining a surface for each cube on a voxel grid. In one embodiment, the threshold is the same for each cube. This comparison generates an eight bit vector serving as an index to the lookup table of FIG. 1. An algorithm demonstrated in FIGS. 3 and 5 and described below is performed to generate polygons for each cube on the grid based on voxel data.

Each vertex of the generated polygons is placed on the appropriate position along the cube's edge by linearly interpolating the two scalar values (voxels) that are connected by that edge. The gradient of the scalar field at each grid point is also the normal vector of a hypothetical isosurface passing through that point. Therefore, these normal vectors may be interpolated along the edges of each cube to find the normal vectors of the generated vertices. The interpolated data is then supplied to a processor which operates to generate 3D images. The resultant image is then typically displayed on a screen.

The present invention comprises rendering a 3D image from a voxel image. Because voxel images generated by medical modalities generally include noise, the rendering system is required to reduce it. MCA may generate incorrect isosurface because of noise and/or because of ambiguous cubes (cubes having topologically ambiguous isosurfaces) as shown in FIG. 2. The present invention allows one to decrease the number of incorrect isosurfaces.

Figure 3:
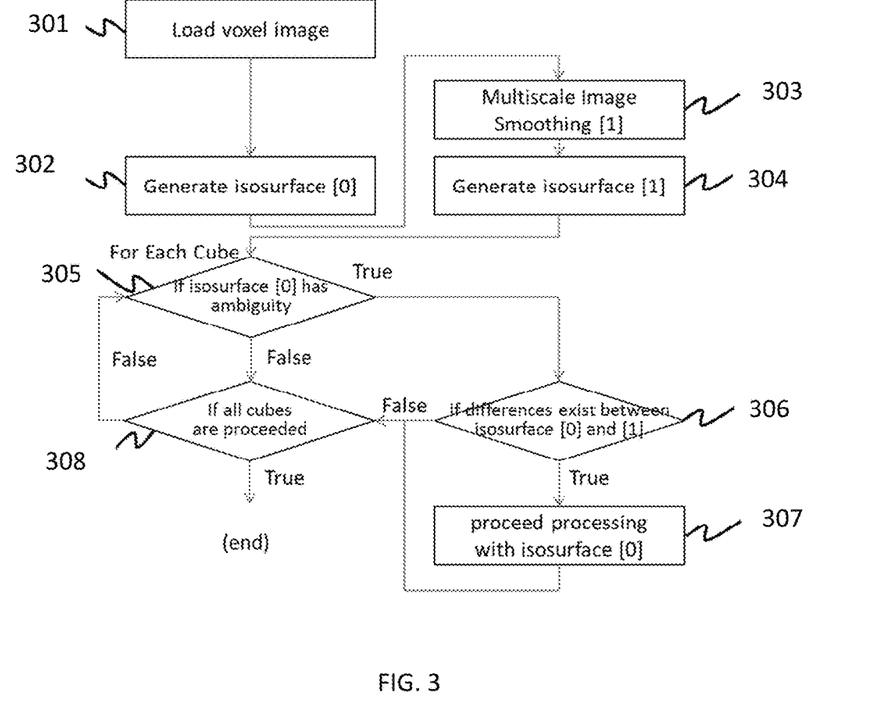
FIG. 3 is a flow chart demonstrating a process for generating an isosurface from a voxel image.

FIG. 3 demonstrates method steps performed to generate an isosurface from an original voxel image according to the present invention. Specifically, the original voxel image is loaded into computer memory from data storage, step 301. A first isosurface (isosurface [0]) is generated from the original voxel image by applying MCA to a first cubic grid corresponding to a first spatial resolution, step 302. As explained above, some of the cubes on the first grid can be ambiguous with respect to the corresponding isosurface topology. In step 303, a filtered voxel image is generated from the original voxel image by using filters such as Laplacian and/or Gaussians filters. Next, the filtered voxel image is down sampled to a coarse voxel image. The filters keep the outer edges. In one embodiment, the resolution of the coarse voxel image is half of the resolution of the original voxel image. For instance, when the spatial resolution of the original voxel image is 512×512×512, the spatial resolution of the coarse voxel image is 256×256×256. Next, a second isosurface (isosurface [1]) is generated from the coarse voxel image by applying MCA to a second cubic grid corresponding to the second spatial resolution, step 304.

Accordingly, isosurfaces [0] and [1] generated in steps 302 and 304 are available for the first and second grid, respectively. As explained in details above, each cube in a grid is defined by eight voxel values placed on the vertexes of the cube.

Because an incorrect isosurface can be generated from an ambiguous cube (the cube that allows for different topologies of the isosurface), a determination is made in step 305 whether the cube is ambiguous or not. As discussed above and shown in FIG. 1, the MCA distinguishes fifteen different cube configurations. The configurations of cubes 3, 6, 7, 10, 12, and 13, as shown in FIG. 1, allow for multiple topologies of the isosurface. If in step 305 it is determined that the current cube is not ambiguous, the algorithm goes to the next cube on the first grid, step 308. If in step 305 it is determined that a cube is ambiguous, isosurface [0] is compared to isosurface [1] to determine a position where there is a difference between the images corresponding to isosurface [0] and isosurface [1], step 306.

Specifically, the face connections (top-bottom; left-right; front-back; top/bottom-left/right; front/back-left/right; front/back-top/bottom) of the cube defining entire isosurface [0] are compared to the face connections of the cube defining entire isosurface [1]. If isosurfaces [0] and [1] are identical, the process proceeds to the next cube on the first grid, step 305.

In one embodiment, if isosurfaces [0] and [1] are different at a specific position, the second 3D image corresponding to isosurface [1] and having lower resolution is used to modify isosurfaces [0] at the specific position and generate a 3D image to be displayed. In yet another embodiment, the second 3D image corresponding to isosurface [1] and the first 3D image corresponding to isosurface [1] around the determine position position are used to generate a 3D image to be displayed.

Figure 4A:
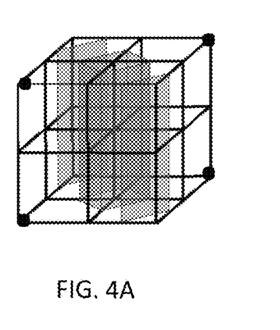
FIG. 4A demonstrates an isosurface for a cube corresponding to a first spatial resolution.
Figure 4B:
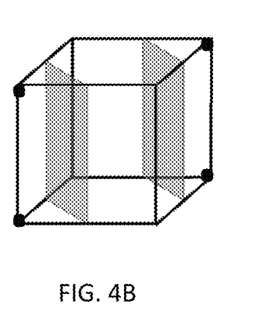
FIG. 4B demonstrates an isosurface for a cube corresponding to a second spatial resolution.

FIG. 4A and FIG. 4B demonstrate an example of isosurface [0] generated on the first grid and isosurface [1] generated on the second grid having lower spatial resolution. Isosurfaces [0] and [1] are different in connections between two faces of a cube. Isosurfaces of FIG. 4A have eleven connections, top-bottom, top-front, top-back, top-right, top-left, bottom-front, bottom-back, bottom-right, bottom-left, front-right and back-left. Isosurfaces of FIG. 4B have eleven connections top-bottom, top-front, top-back, top-right, top-left, bottom-right, bottom-left, front-left and back-right.

Figure 4C:
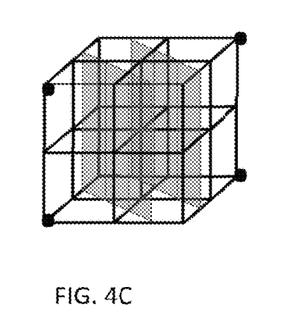
FIG. 4C demonstrates the isosurface of FIG. 4A modified in view of the isosurface of FIG. 4B.

As indicated by step 307 of FIG. 3, when differences between isosurfaces [0] and [1] are detected, compensation is performed. Specifically, when corresponding faces of the first isosurface are connected and the corresponding faces of the second isosurface are disconnected, software modifies the first isosurface to disconnect. When first isosurface is disconnected and second isosurface is connected, software modifies first isosurface to connect. In the present example, software modifies isosurface to disconnect front-right and back-left connections, and to connect front-left and back-right connections. FIG. 4C shows a corrected isosurface [0] modified based on the isosurface [1].

In one embodiment as described above, the first and second isosurfaces are generated before checking the cubes of the first grid for ambiguity. However, in yet another embodiment, if the first isosurface is not ambiguous (there are no ambiguous cubes on the first grid), generating the second isosurface is not necessary.

Different compensation algorithms applied in step 307 of FIG. 3 can be used in the present invention. In one embodiment, the following compensation algorithm is applied to the first isosurface including at least one ambiguous cube:
1. When at least one of first and second isosurfaces is disconnected, software modifies first isosurface to disconnect.
2. When at least one of first and second isosurfaces is connected, software modifies first isosurface to connect.
3. When only first isosurface includes small disconnected parts respect to main part, software removes them.

Figure 5:
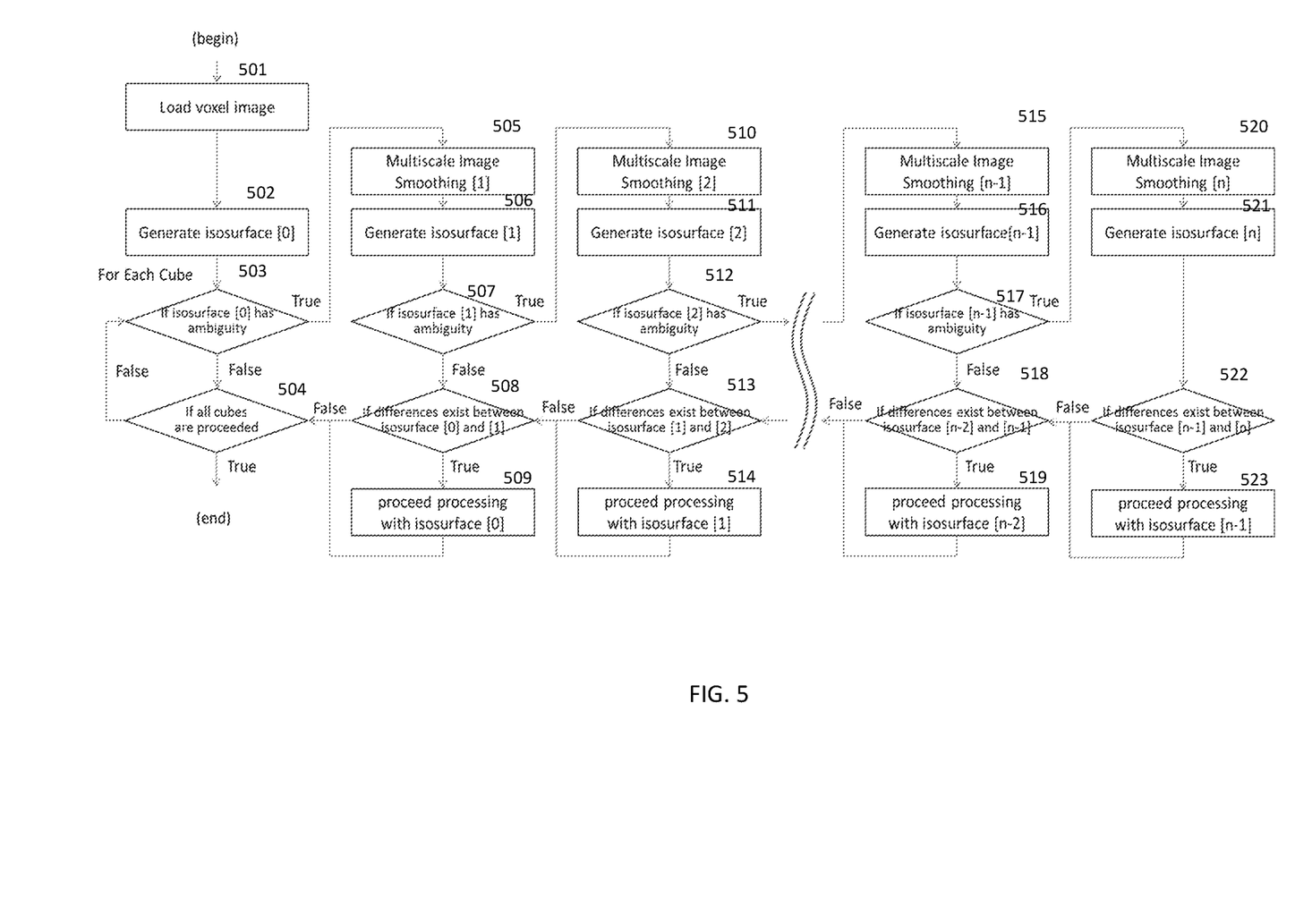
FIG. 5 demonstrates a flow chart for generating an isosurface from a voxel image.

FIG. 5 demonstrates a generalized flow chart for generating an isosurface from a voxel image. The number 0 refers an isosurface based on the original image. Large numbers refer to isosurfaces corresponding to coarse images having lower resolution than the original image. The ratio of resolutions between isosurface [i] and isosurface [i+1] is not limited to power of two. The number n is a maximum depth of multiscale. When n=1, processes demonstrated in FIG. 3 and FIG. 5 are the same.

Referring to FIG. 5, the process starts by loading a voxel image in step 501. A first isosurface (isosurface [0]) is generated on a first grid in step 502. Next, for each cube of the first grid, it is determined if isosurface [0] has ambiguity, i.e. the cube is ambiguous, step 503. If the answer is no, the algorithm proceeds to the next cube in the first grid. However, if the cube is ambiguous, a smoothed multiscale image in a second spatial resolution is generated in step 505. A second isosurface [1] is generated on a second grid. The second grid has lower spatial resolution than the first grid, step 506. In step 507, a determination is made whether the second grid corresponding to isosurface [1] has ambiguous cubes. If isosurface [1] has no ambiguous cubes, it is checked whether there is a difference between isosurfaces [0] and [1], step 508. If isosurfaces [0] and [1] are identical, the algorithm proceeds to the next cube on the first grid in step 503. If in step 504 it is determined that there are no more cubes on the first grid, the algorithm ends. If isosurfaces [0] and [1] are not identical, a corrected isosurfaces [0] is generated based on isosurface [1], step 509. The rules used for modifying isosurfaces [0] are the same as the rules used at step 307 of FIG. 3.

If in step 507 it is determined that isosurface [1] has ambiguity, the algorithm proceeds to step 510 directed to generating a smooth multiscale voxel image on a third grid. The third grid has a lower spatial resolution than the second grid. Steps 510-514 applied to isosurfaces [1] and [2] and steps 515-519 applied to isosurfaces [n−1] and [n] are identical to steps 505-509 applied to isosurfaces [0] and [1]. The algorithm ends in steps 522 and 523 which are analogous to steps 306 and 307 of FIG. 3. In one embodiment, n is the largest number which satisfies computation time/resource restriction. Decision boxes 503, 507, 512 and 517 prune the processes to save computation resources though they are not necessary. Differences between coarse isosurfaces might exist when ambiguity exists.

Figure 6:
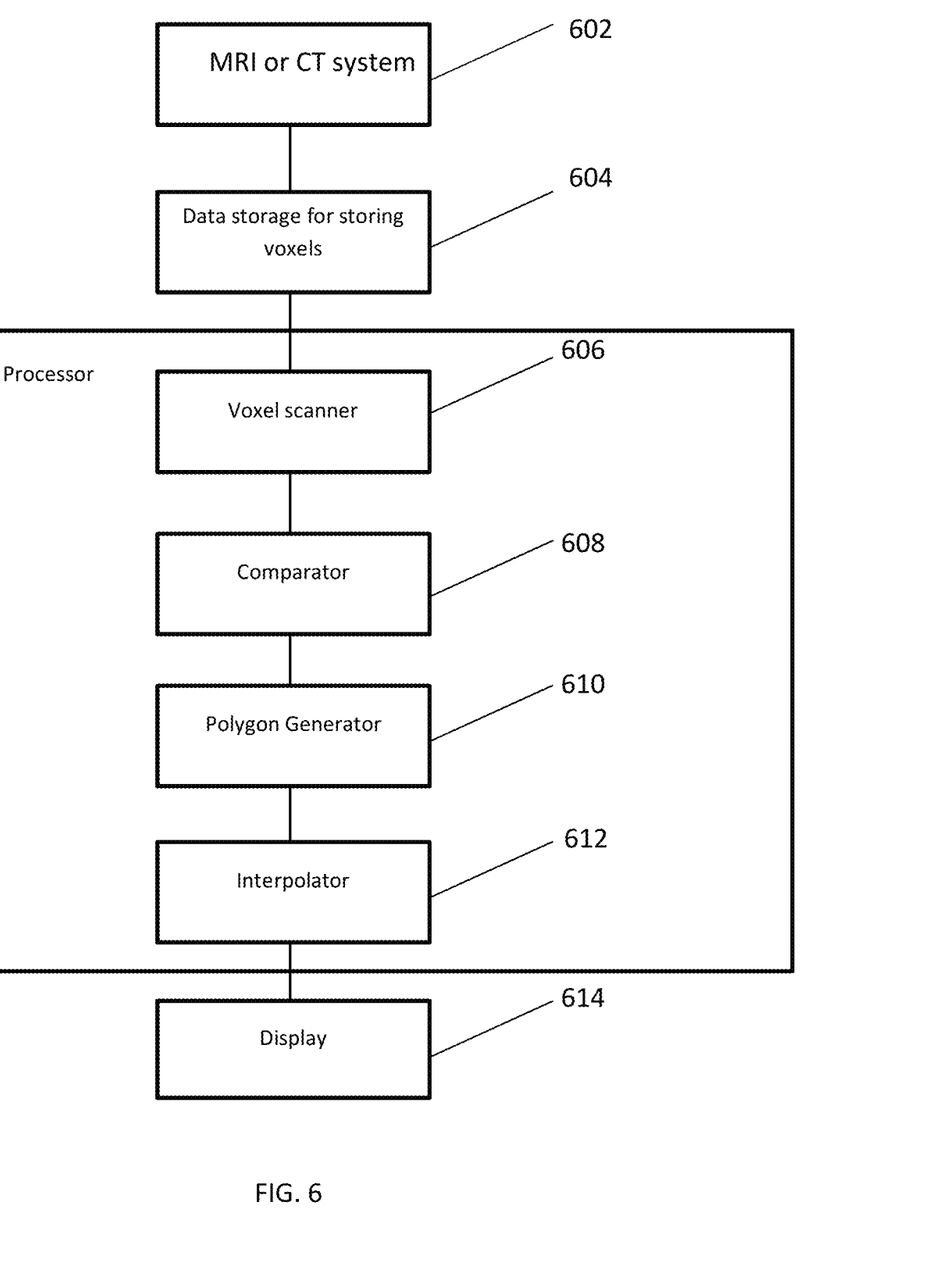
FIG. 6 illustrates a system for imaging an isosurface obtained from a voxel image in accordance with the present invention.

FIG. 6 illustrates a system for imaging an isosurface in accordance with the present invention. In one embodiment, three dimensional data is provided by an MRI or CT system 602. Other three dimensional data sources may also be employed. Typically, this information is supplied to computer data storage 604. The data storage 604 is a machine-readable medium (automated data medium) capable of storing data in a format readable by a mechanical device. This system typically includes magnetic or other storage media. A voxel scanner 606 selects the particular set of eight data points for processing. These eight data points are supplied to a comparator 608 which is also supplied with a threshold value. The comparator 608 generates eight bit vectors each of which defines a vertex as described above. The eight bit vectors are then supplied to a polygon generator 610 that performs a series of instructions as demonstrated in FIG. 5.

The scanner 606 also supplies the set of eight voxel signals to an interpolator 612 which is supplied with the threshold value and with the set of vectors from the polygon generator 610. As described above, an interpolation operation is performed to generate a polygonal surface approximation to the selected surface. The processor then generates a signal which is supplied to a display device 614 to present the surface to a user.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A method for generating an isosurface from a voxel image obtained from a medical modality, the method comprising:
    applying to at least a portion of the voxel image the Marching Cube Algorithm (MCA) in a first spatial resolution to generate a first isosurface, wherein the first spatial resolution corresponds to a first cubic grid;
    applying to the at least a portion of the voxel image the MCA in a second spatial resolution to generate a second isosurface, wherein the second spatial resolution is lower than the first spatial resolution and corresponds to a second cubic grid;
    identifying ambiguous cubes on the first cubic grid, wherein an ambiguous cube is a cube having an ambiguity in isosurface topology;
    for each identified ambiguous cube determining whether there is a difference between the first and second isosurfaces; and
    modifying the first isosurface based on the second isosurface if the first isosurface is different from the second isosurface, such that the modified first isosurface has connections with faces of a cube or cubes of the first cubic grid, the connections of the modified first isosurface being the same as or similar to connections of the second isosurface to a cube or cubes of the second cubic grid.

2. The method of claim 1, further comprising determining if the second cubic grid has ambiguous cubes and applying the MCA to a third cubic grid corresponding to a third spatial resolution that is lower than the second resolution if the second cubic grid has ambiguous cubes.

3. The method of claim 1, wherein the difference between the first and second isosurfaces is determined based on respective, corresponding connections between respective, corresponding cube faces.

4. The method of claim 3, wherein when the first isosurface has faces that are connected and corresponding faces of the second isosurface are disconnected, the first isosurface is modified to disconnect the faces so that the modified first isosurface and the second isosurface have the same or similar respective, corresponding cube face connections.

5. The method of claim 3, wherein when corresponding faces of at least one of the first and second isosurfaces are disconnected, the first isosurface is modified to disconnect one or more faces of the first isosurface so that the modified first isosurface and the second isosurface have the same or similar respective, corresponding cube face connections.

6. The method of claim 3, wherein when corresponding faces of at least one of the first and second isosurfaces are connected, the first isosurface is modified to connect one or more faces of the first isosurface so that the modified first isosurface and the second isosurface have the same or similar cube face connections.

7. The method of claim 1, wherein when only the first isosurface includes disconnected parts due to noise, the disconnected parts are removed.

8. The method of claim 1, wherein the voxel image is obtained from a CT or MRI system.

9. The method of claim 1, wherein a ratio of resolutions is a power of two.

10. The method of claim 1, further comprising filtering noise from the voxel image prior to generating the second isosurface.

11. The method of claim 1, wherein the first isosurface is modified such that the resolution of the first isosurface and/or the first cubic grid is maintained or is unchanged.

12. A system for generating an isosurface from a voxel image obtained from a medical modality, the method comprising:
    memory in communication with a processor, the memory including the voxel image;
    the processor executing instructions comprising:
    applying to at least a portion of the voxel image the Marching Cube Algorithm (MCA) in a first spatial resolution to generate a first isosurface, wherein the first spatial resolution corresponds to a first cubic grid;
    applying to the at least a portion of the voxel image the MCA in a second spatial resolution to generate a second isosurface, wherein the second spatial resolution is lower than the first spatial resolution and corresponds to a second cubic grid;
    identifying ambiguous cubes on the first cubic grid, wherein an ambiguous cube is a cube having an ambiguity in isosurface topology;
    for each identified ambiguous cube determining whether there is a difference between the first and second isosurfaces; and
    modifying the first isosurface based on the second isosurface if the first isosurface is different from the second isosurface such that the modified first isosurface has connections with faces of a cube or cubes of the first cubic grid, the connections of the modified first isosurface being the same as or similar to connections of the second isosurface to a cube or cubes of the second cubic grid.

13. The system of claim 12, wherein the MCA is applied to a third cubic grid corresponding to a third spatial resolution that is lower than the second resolution if the second cubic grid has ambiguous cubes.

14. The system of claim 12, wherein the difference between the first and second isosurfaces is determined based on respective, corresponding connections between respective, corresponding cube faces.

15. The system of claim 14, wherein when the first isosurface has faces that are connected and corresponding faces of the second isosurface are disconnected, the first isosurface is modified to disconnect the faces so that the modified first isosurface and the second isosurface have the same or similar respective, corresponding cube face connections.

16. The system of claim 14, wherein when corresponding faces of at least one of the first and second isosurfaces are disconnected, the first isosurface is modified to disconnect one or more faces of the first isosurface so that the modified first isosurface and the second isosurface have the same or similar respective, corresponding cube face connections.

17. The system of claim 14, wherein when corresponding faces of at least one of the first and second isosurfaces are connected, the first isosurface is modified to connect one or more faces of the first isosurface so that the modified first isosurface and the second isosurface have the same or similar cube face connections.

18. The system of claim 12, wherein when only the first isosurface includes disconnected parts caused by noise, the disconnected parts are removed.

19. The system of claim 12, wherein the voxel image is obtained from a CT or MRI system.

20. The system of claim 12, wherein a ratio of resolutions is a power of two.

21. The system of claim 12, wherein noise is filtered from the voxel image prior to generating the second isosurface.

22. The system of claim 12, wherein the first isosurface is modified such that the resolution of the first isosurface and/or the first cubic grid is maintained or is unchanged.

* * * * *